(12) United States Patent
Vazhenin et al.

(10) Patent No.: US 10,027,430 B1
(45) Date of Patent: *Jul. 17, 2018

(54) METHOD AND APPARATUS FOR ESTIMATING THE CURRENT SIGNAL-TO-THERMAL NOISE RATIO AND SIGNAL-TO-PULSE NOISE RATIO

(71) Applicant: Topcon Positioning Systems, Inc., Livermore, CA (US)

(72) Inventors: Nikolay Afanasievich Vazhenin, Moscow (RU); Andrey Vladimirovich Veitsel, Moscow (RU); Vladimir Victorovich Veitsel, Moscow (RU); Fedor Borisovich Serkin, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/549,459

(22) PCT Filed: Apr. 18, 2017

(86) PCT No.: PCT/RU2017/000246
§ 371 (c)(1),
(2) Date: Aug. 8, 2017

(51) Int. Cl.
*H04B 1/10* (2006.01)
*H04B 17/336* (2015.01)
*H04B 1/12* (2006.01)

(52) U.S. Cl.
CPC ............. *H04B 17/336* (2015.01); *H04B 1/12* (2013.01)

(58) Field of Classification Search
CPC ...... H04B 17/336; H04B 1/12; H04B 1/1036; H04L 25/03038; H04L 27/2647; H04L 2025/03414; H04L 25/03057
(Continued)

(56) References Cited

U.S. PATENT DOCUMENTS 7,190,741 B1 3/2007 Manning
9,425,908 B1 8/2016 Vazhenin et al.
(Continued)

FOREIGN PATENT DOCUMENTS

WO 2007114963 A2 10/2007

OTHER PUBLICATIONS

Search Report in PCT/RU2017/000246, dated Nov. 20, 2017.

*Primary Examiner* — Zewdu Kassa
(74) *Attorney, Agent, or Firm* — Bardmesser Law Group (57) ABSTRACT

An apparatus to measure signal-to-thermal noise ratio (SNR) and signal-to-pulse noise ratio (SPNR), the apparatus including a quadrature mixer, a pulse noise reduction unit, an SNR estimation unit and an offset compensation unit, connected in series, the quadrature mixer receiving the input radio signal and outputting an in-phase component and a quadrature component; a pulse noise separation unit, and an SPNR estimation unit connected series, the pulse noise reduction unit and the pulse noise separation unit inputting the in-phase and quadrature components; the SPNR estimation unit inputting a filtered in-phase component from the pulse noise reduction unit. The offset compensation unit outputs a current SNR. The SPNR estimation unit outputs a current SPNR. The pulse noise separation unit includes a first LPF, an impulse noise separator and an HPF, connected in series; and a second LPF, a pulse noise detection unit and an inverter, connected in series.

5 Claims, 5 Drawing Sheets (58) Field of Classification Search
USPC .................. 375/350, 346, 316, 295, 219
See application file for complete search history.

(56) References Cited

U.S. PATENT DOCUMENTS

2006/0265215 A1\* 11/2006 Hetherington ...... G10L 21/0208
704/226
2017/0041027 A1 2/2017 Vazhenin et al.

\* cited by examiner

METHOD AND APPARATUS FOR ESTIMATING THE CURRENT SIGNAL-TO-THERMAL NOISE RATIO AND SIGNAL-TO-PULSE NOISE RATIO

CROSS REFERENCE TO RELATED APPLICATIONS

This application is a US National Phase of PCT/RU2017/000246 filed on Apr. 18, 2017.

BACKGROUND OF THE INVENTION

Field of the Invention

The present invention relates generally to digital systems for signal reception and processing, and, more particularly, to estimating the current signal-to-thermal noise ratio and signal-to-pulse noise ratio.

Description of the Related Art

The task of estimating a current signal-to-thermal noise ratio or simply signal-to-noise ratio (SNR)

$$SNR = \frac{P_s}{P_n} \quad (1)$$

and signal-to-pulse noise ratio (SPNR)

$$SPNR = \frac{P_s}{P_p} \quad (2)$$

is important for radio communication systems, navigation and location systems. Knowing the SNR allows adjusting parameters of the receiver, such as filter bandwidth, center frequency and so on. Similarly, knowing that there is periodic pulse noise (such as from nearby machinery that causes sparks) allows adjusting the parameters of the receiver.

In expressions (1) and (2): $P_s$ is the average power of the desired signal at the receiver input, $P_n$ is the average power of the additive thermal noise within the reception band at the receiver input, $P_p$ is the average power of the pulse noise at the receiver input.

U.S. Pat. No. 9,425,908 B2, incorporated herein by reference in its entirety, discloses a method and apparatus for estimating the current signal-to-noise ratio. However, this apparatus is not intended for operating at simultaneous effects of thermal and pulse noise.

U.S. Pat. No. 9,191,048 B2, incorporated herein by reference in its entirety, describes a Quadrature Impulse Noise Remover. But this technical solution cannot be used directly for estimation of SNR or SPNR.

Accordingly, there is a need in the art for a system and method that estimates thermal and pulse noise.

SUMMARY OF THE INVENTION

The present invention is related to estimating the current signal-to-thermal noise ratio and signal-to-pulse noise ratio at the input of the receiving unit when both broad-band additive Gaussian noise (thermal noise) and additive pulse noise destructively affect the received desired signal that substantially obviates one or more of the disadvantages of the related art.

In one aspect of the invention, there is provided an apparatus to measure signal-to-thermal noise ratio (SNR) and signal-to-pulse noise ratio (SPNR) of an incoming input radio signal, the apparatus including a quadrature mixer, a pulse noise reduction unit, an SNR estimation unit and an offset compensation unit, connected in series, the quadrature mixer receiving the input radio signal and outputting an in-phase component and a quadrature component; a pulse noise separation unit, and an SPNR estimation unit connected series, the pulse noise reduction unit and the pulse noise separation unit inputting the in-phase and quadrature components; the SPNR estimation unit inputting a filtered in-phase component from the pulse noise reduction unit. The offset compensation unit outputs a current SNR. The SPNR estimation unit outputs a current SPNR.

Optionally, the pulse noise separation unit includes a first low pass filter (LPF), an impulse noise separator and a high pass filter (HPF), connected in series; and a second LPF, a pulse noise detection unit and an inverter, connected in series. The first LPF inputs the in-phase component. The second LPF inputs the quadrature component. The pulse noise detection unit also inputs an output of the first LPF. The impulse noise separator inputs an output of the inverter. The output of the HPF is an output of the pulse noise separation unit.

Optionally, the SPNR estimation unit includes a first squaring unit, a first low pass filter (LPF), a divider and a dB-recalculation unit, connected in series; and an absolute value unit, a second LPF and a squaring unit, connected in series. The first squaring unit receives an output of the pulse noise separation unit. The absolute value unit receives the filtered in-phase component. The divider also receives an output of the second squaring unit. An output of the dB-recalculation unit is the signal-to-pulse noise ratio.

Optionally, the pulse noise detection unit includes a first squaring unit and second squaring unit providing their outputs to a summer; a square root unit, a comparator and an impulse generator connected in series; a threshold generation unit providing an output to the comparator. An output of the impulse generator is provided to the inverter. The first squaring unit and the second squaring unit receive inputs from the first and second LPFs, respectively.

Alternatively, the pulse noise detection unit includes a first absolute value unit, a first comparator, and a first impulse generator, connected in series; a second absolute value unit, a second comparator, and a second impulse generator, connected in series; and a threshold generator providing an output to the first and second comparators. Outputs of the first and second impulse generators are ORed and provided as an output of the pulse noise detection unit. The first and second squaring units receive outputs of the first and second LPFs, respectively.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

The pulse noise is presented in the form of a random sequence of pulses, each of which can be a radio quasi-harmonic carrier pulse or a pseudo-noise pulse with variously shaped signal envelopes. It should be noted that medium frequency, phase, duration, pulse repetition period, and signal envelope shapes can be random and/or function-dependent (i.e., described by some function of time).

Let us further assume that a modulated radio signal, for example, a BPSK signal, is used as the desired (information) signal, and the average duration of noise pulse is smaller than the duration of the channel symbol of the desired signal.

This can be achieved first, by separating time intervals of influencing noise pulses, and second, by separating the received representation of pulse noise and an estimate of its average power from the received mixture of signal, noise and pulse interference, and third, by eliminating the desired signal and average power of thermal noise from the received mixture of pulse noise and an estimate of its average power.

Figure 1:
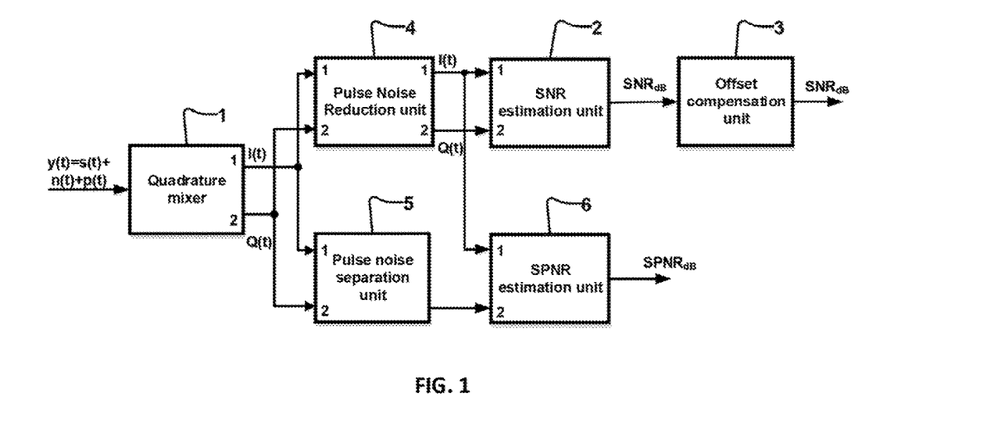
FIG. 1 illustrates a structural block diagram of the proposed device.
Figure 2:
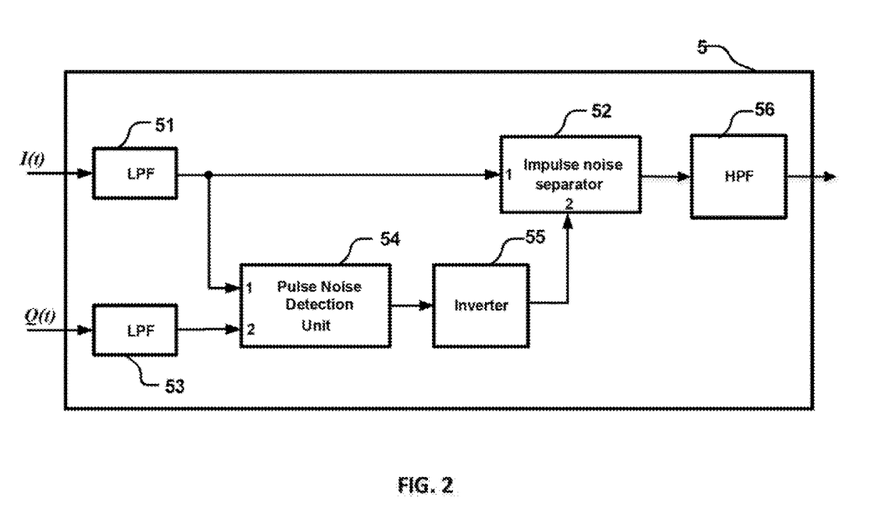
FIG. 2 illustrates an embodiment of pulse noise separation unit.
Figure 3:
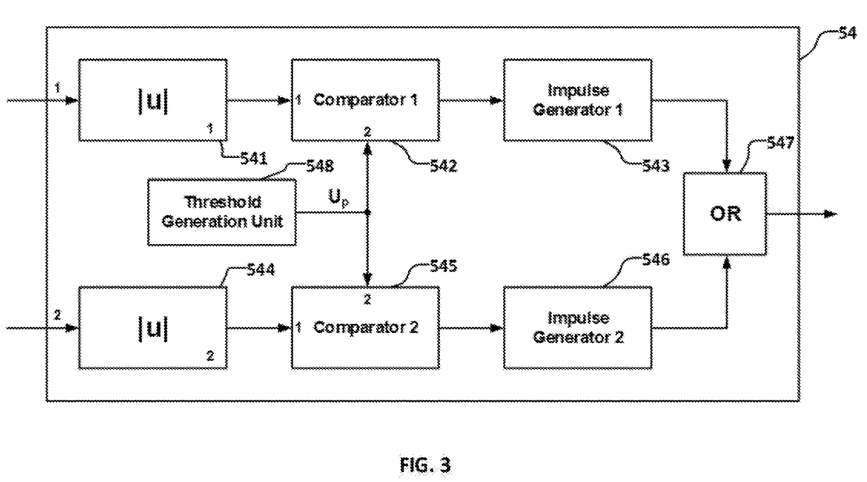
FIG. 3 illustrates an embodiment of pulse noise detection unit (version 1)
Figure 4:
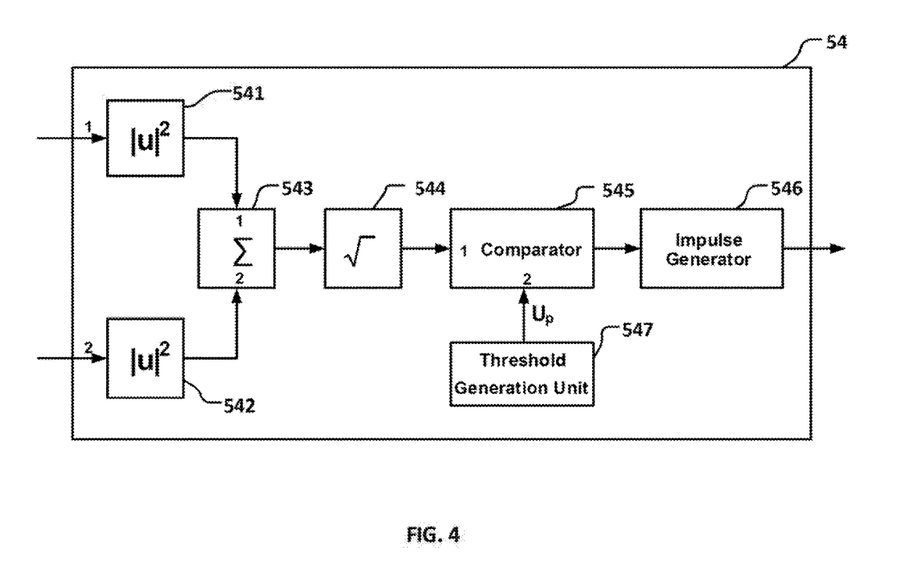
FIG. 4 illustrates another embodiment of pulse noise detection unit (version 2)
Figure 5:
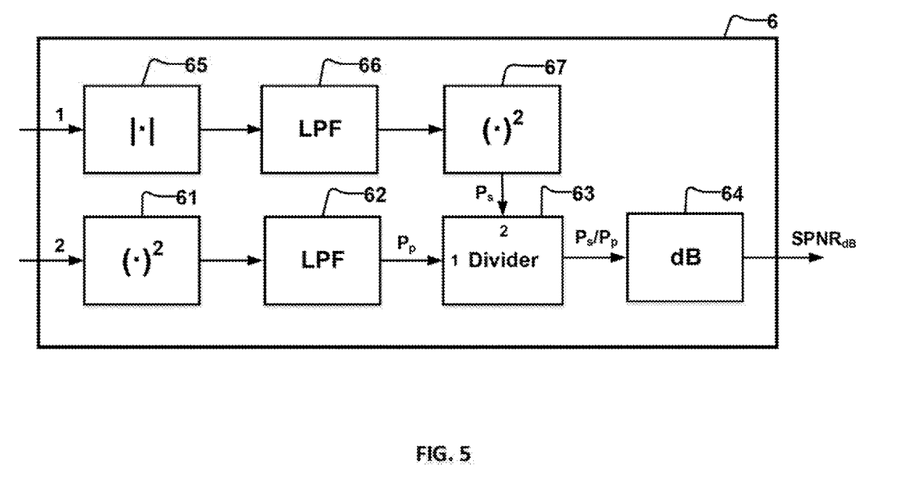
FIG. 5 illustrates an embodiment of an SPNR estimation unit.

FIG. 1 illustrates a structural block diagram of the proposed device. FIG. 2 illustrates an embodiment of pulse noise separation unit (5). FIG. 3 illustrates an embodiment of pulse noise detection unit (54) (version 1). FIG. 4 illustrates another embodiment of pulse noise detection unit (54) (version 2). FIG. 5 illustrates an embodiment of SPNR estimation unit (6).

With further reference to the figures, the device to measure signal-to-thermal noise ratio and signal-to-pulse noise ratio includes a quadrature mixer (1), an SNR estimation unit (2) and an offset compensation unit (3), as well as a pulse noise reduction unit (4), a pulse noise separation unit (5), and an SPNR estimation unit (6). The input of quadrature mixer (1) is the input of the system, where the first and the second outputs of quadrature mixer (1) are respectively connected to the first and second inputs of the pulse noise reduction unit (4) and pulse noise separation unit (5), the first and second outputs of pulse noise reduction unit (4) are connected respectively to the first and second inputs of SNR estimation unit (2), the output of which is connected to the input of the offset compensation unit (3), the output of which is the first output of the device. The output of the pulse noise separation unit (5) is connected to the second input of SPNR estimation unit (6), the first input of which is connected to the first output of the pulse noise reduction unit (4), and the output of the SPNR estimation unit (6) is the second output of the system.

The pulse noise separation unit (5) can be made as sequentially connected elements: a first low pass filter (LPF) (51), the output of which is the first input of pulse noise separation unit (5), an impulse noise separator (52) and a high pass filter (HPF) (56). The output of the HPF 56 is the output of the pulse noise separation unit (5), the second input of which is the input of the second low pass filter (LPF) (53), the output of which is connected to the second input of pulse noise detection unit (54), the first input of which is connected to the output of the first low pass filter (LPF) (51), and the output is connected to the input of an inverter (55), the output of which is connected to the second input of the impulse noise separator (52).

The SPNR estimation unit (6) can be made as a sequentially connected first squaring unit (61), a first low pass filter (LPF) (62), a divider (63), and a dB-recalculation unit (64), as well as a sequentially connected absolute value unit (65), a second low pass filter (LPF) (66) and a second squaring unit (67), the inputs of the first squaring unit (61) and the absolute value unit (65) being the second and the first inputs of the SPNR estimation unit (6), the output of the second squaring unit (67) being connected to the second input of the divider (63), and the output of dB-recalculation unit (64) being the output of the SPNR estimation unit (6).

The pulse noise detection unit (54) can be made as (FIG. 3 according to U.S. Pat. No. 9,191,048) a first absolute value unit (541) and a first comparator (542), and a first impulse generator (543), connected in series; a second absolute value unit (544), a second comparator (545), and a second impulse generator (546), connected in series; and a threshold generator (548) providing an output to the second inputs of first (542) and second (545) comparators. Outputs of the first (543) and second (546) impulse generators are ORed and provided as an output of the pulse noise detection unit (54). The first (541) and second (544) squaring units receive outputs of the first (51) and second (53) LPFs, respectively.

The pulse noise detection unit (54) can be made as shown in FIG. 4, with a first squaring unit (541) and second squaring unit (542) and sequentially connected accumulator (543), a square root unit (544), a comparator (545) and impulse generator (546), the inputs of the first squaring unit (541) and the second squaring unit (542) being the first and second inputs of the pulse noise detection unit (54), the outputs of the first squaring unit (541) and the second squaring unit (542) being connected to the first and the second inputs of the accumulator (543), the second input of the comparator (545) being connected with the output of a threshold generation unit (547), and the output of the pulse noise detection unit (54) is the output of the impulse generator (546).

The received signal y(t), which represents a mixture of the desired signal s(t), additive thermal noise n(t) and pulse noise p(t), $$y(t)=s(t)+n(t)+p(t) \qquad (3)$$

is fed to the input of quadrature mixer (1) (see FIG. 1), at the output of which in-phase and quadrature components of the complex envelope for the received mixture are generated. It is assumed that in the quadrature mixer, a phase lock system/loop operates with low error, whose value is limited by the equivalent tracking band.

To estimate the current signal-to-noise ratio, these quadrature components are fed to the input of the pulse noise reduction unit (4) implemented according to U.S. Pat. No. 9,191,048. Similar quadrature components, but filtered out from pulse noise components, are generated at the output of the pulse noise reduction unit (4).

These signals are fed to the corresponding inputs of the SNR estimation unit (2) and further to the offset compensation unit (3). These units are implemented as described in U.S. Pat. No. 9,425,908, which is incorporated herein by reference in its entirety.

In addition, signals from the output of the quadrature mixer (1) are fed to the corresponding inputs of the pulse noise separation unit (5), and further, from its output to the second input of the SPNR estimation unit (6), the output of which is the second output of the proposed system.

Pulse noise separation unit (5) can be implemented according to FIG. 2. Units (51), (52) and (54) may be made in accordance with technical solutions described in U.S. Pat. No. 9,191,048, which is incorporated herein by reference in its entirety. FIGS. 3 and 4 illustrate embodiments of pulse noise detection unit (54).

Impulse noise separator (52) may be implemented similar to impulse noise remover (2) of any quadrature channels according to U.S. Pat. No. 9,191,048.

Parameters of the high pass filters are selected such that the filter would suppress all spectrum components of the information signal and let pulse noise components pass to the maximum degree, note that the pulse noise is a more broadband process under the conditions of the problem.

The SPNR estimation unit (6) (see FIG. 5) works as follows: an in-phase signal component is fed to input 1 from the pulse noise reduction unit (4), this in-phase component has been filtered out/cleared off from pulse noise in the pulse noise reduction unit (4). The absolute value unit (65) removes code modulation. Then, the signal is averaged over the given time interval by the second low pass filter (LPF) (66) and thereby the amplitude of the desired signal is determined. After squaring in the second squaring unit (67) the signal is proportional to the power of the desired signal and is further fed to the second input of divider (63). A signal corresponding to the component separated from the input mixture of pulse components after the first squaring unit (61) and the first LPF (62) is fed to the first input of divider (63). This signal is proportional to the average power of pulse noise.

So a ratio of the desired signal power to pulse noise power can be calculated at the output of the divider (63), this ratio is further converted into SPNR in the dB-recalculation unit (64).

As will be appreciated by one of ordinary skill in the art, the various blocks shown in FIGS. 1-5 can be implemented as discrete hardware components, as an ASIC (or multiple ASICs), as either discrete analog or digital components, and/or as software running on a processor.

Thus, the proposed technical solution allows estimation of the current SNR for each noise type separately when interference is available as a mixture of thermal and pulse noise. Based on the estimated SNR and SPNR, the receiver can adjust its parameters, such as its filter bandwidth, filter shape, center frequency and so on.

Having thus described a preferred embodiment, it should be apparent to those skilled in the art that certain advantages of the described method and apparatus have been achieved.

It should also be appreciated that various modifications, adaptations and alternative embodiments thereof may be made within the scope and spirit of the present invention. The invention is further defined by the following claims.

What is claimed is:

1. An apparatus to measure signal-to-thermal noise ratio (SNR) and signal-to-pulse noise ratio (SPNR) of an incoming input radio signal, the apparatus comprising:
   a quadrature mixer, a pulse noise reduction unit, an SNR estimation unit and an offset compensation unit, connected in series,
   the quadrature mixer receiving the input radio signal and outputting an in-phase component and a quadrature component;
   a pulse noise separation unit, and an SPNR estimation unit connected series,
   the pulse noise reduction unit and the pulse noise separation unit inputting the in-phase and quadrature components;
   the SPNR estimation unit inputting a filtered in-phase component from the pulse noise reduction unit,
   wherein the offset compensation unit outputs a current SNR, and
   wherein the SPNR estimation unit outputs a current SPNR.

2. The apparatus of claim 1, wherein the pulse noise separation unit includes:
   a first low pass filter (LPF), an impulse noise separator and a high pass filter (HPF), connected in series; and
   a second LPF, a pulse noise detection unit and an inverter, connected in series,
   wherein the first LPF inputs the in-phase component,
   wherein the second LPF inputs the quadrature component,
   wherein the pulse noise detection unit also inputs an output of the first LPF,
   wherein the impulse noise separator inputs an output of the inverter, and
   wherein an output of the HPF is an output of the pulse noise separation unit.

3. The apparatus of claim 2, wherein the SPNR estimation unit includes:
   a first squaring unit, a first low pass filter (LPF), a divider and a dB-recalculation unit, connected in series; and
   an absolute value unit, a second LPF and a squaring unit, connected in series,
   wherein the first squaring unit receives an output of the pulse noise separation unit,
   wherein the absolute value unit receives the filtered in-phase component,
   wherein the divider also receives an output of the second squaring unit, and
   wherein an output of the dB-recalculation unit is the signal-to-pulse noise ratio.

4. The apparatus of claim 2, wherein the pulse noise detection unit includes:
   a first squaring unit and second squaring unit providing their outputs to a summer,
   a square root unit, a comparator and an impulse generator connected in series;
   a threshold generation unit providing an output to the comparator,
   wherein an output of the impulse generator is provided to the inverter, and
   wherein the first squaring unit and the second squaring unit receive inputs from the first and second LPFs, respectively.

5. The apparatus of claim 2, wherein the pulse noise detection unit includes:
- a first squaring unit, a first comparator, and a first impulse generator, connected in series;
- a second squaring unit, a second comparator, and a second impulse generator, connected in series; and
- a threshold generator providing an output to the first and second comparators;
- wherein outputs of the first and second impulse generators are ORed and provided as an output of the pulse noise detection unit, and
- wherein the first and second squaring units receive outputs of the first and second LPFs, respectively.

\* \* \* \* \*